United States Patent
Jacoby et al.

(10) Patent No.: US 7,941,527 B1
(45) Date of Patent: May 10, 2011

(54) TUNING AGING PARAMETERS FOR FLOWS IN FLOW-BASED SYSTEMS

(75) Inventors: Doron Jacoby, Kfar Vitkin (IL); Assi Abramovitz, Tel-Aviv (IL); Alon Juszynski Maor, Shoham (IL); Doron Oz, Even Yehuda (IL)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 11/942,042

(22) Filed: Nov. 19, 2007

(51) Int. Cl.
*G06F 15/173* (2006.01)
*G06F 15/16* (2006.01)

(52) U.S. Cl. .................. 709/224; 709/234; 370/229

(58) Field of Classification Search .......... 709/224, 709/242, 234; 370/229
See application file for complete search history.

(56) References Cited

U.S. PATENT DOCUMENTS

| | | | |
|---|---|---|---|
| 6,097,718 A | 8/2000 | Bion | |
| 6,871,265 B1 | 3/2005 | Oren et al. | |
| 6,934,256 B1 | 8/2005 | Jacobson et al. | |
| 7,042,843 B2 * | 5/2006 | Ni | 370/231 |
| 7,076,543 B1 | 7/2006 | Kirti et al. | |
| 7,212,490 B1 | 5/2007 | Kao et al. | |
| 7,249,303 B2 * | 7/2007 | Dottling et al. | 714/748 |
| 7,274,693 B1 | 9/2007 | Kloth et al. | |
| 2001/0014081 A1 * | 8/2001 | Kawasaki et al. | 370/235 |
| 2003/0152076 A1 * | 8/2003 | Lee et al. | 370/389 |
| 2005/0052992 A1 * | 3/2005 | Cloonan et al. | 370/229 |
| 2006/0221823 A1 | 10/2006 | Shoham | |
| 2008/0008097 A1 * | 1/2008 | Avadhanam | 370/235 |
| 2008/0043620 A1 * | 2/2008 | Ye | 370/232 |

* cited by examiner

*Primary Examiner* — Ranodhi N Serrao
(74) *Attorney, Agent, or Firm* — Cesari and McKenna, LLP

(57) ABSTRACT

In one embodiment, flows are monitored that are open for a length of time until ending by either a distinct ending or by being silent longer than a configured aging timer (wherein a silent flow is a "zombie flow"). In response to each first flow ending, a total flow time value may be increased by a length of time that first flow was open, and in response to each second flow ending by aging, a zombie flow time value may be increased by the aging timer. A ratio of zombie flows at a particular time in the computer network that will be ended by aging may be estimated as the zombie flow time value divided by the total flow time value. Also, in other embodiments, a capacity improvement, performance hit, and accuracy hit may be predicted based on a new aging timer value.

20 Claims, 7 Drawing Sheets

US 7,941,527 B1

TUNING AGING PARAMETERS FOR FLOWS IN FLOW-BASED SYSTEMS

TECHNICAL FIELD

The present disclosure relates generally to computer networks, and, more particularly, to aging parameters of flows in the computer networks.

BACKGROUND

In any system which keeps resources per flow, there is generally the question of identifying when flows end and when their resources can be released. For some flows, this question may be easy to answer (e.g., Transmission Control Protocol or "TCP" flows that close with specific end messages or "FINs"). For other flows (e.g., any User Datagram Protocol or "UDP" flows, or TCP flows with no FIN messages), however, this is typically answered based on aging techniques. In other words, when a flow has no traffic for a predefined (long enough) aging time (i.e., is "silent"), the flow is considered to have ended. An issue thus involves determining the best aging time per flow type.

In particular, the aging time generally affects resources, performance (e.g., processor cycles), and accuracy. That is, if the aging time is too short, and the flow resources are released before the actual flow ends, a new "flow open" event will be triggered to handle the rest of the flow in some systems, or the flow might be mistreated altogether in others (a firewall, for example). Alternatively, if the aging time is too long, flows may remain open for a long time before ending by aging, thus inefficiently allocating resources for the silent flow. These factors, as will be appreciated by those skilled in the art, affect both performance and accuracy. There remains a need, therefore, for a technique that provides a tool for use with tuning aging parameters of flows.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

OVERVIEW

Figure 1:
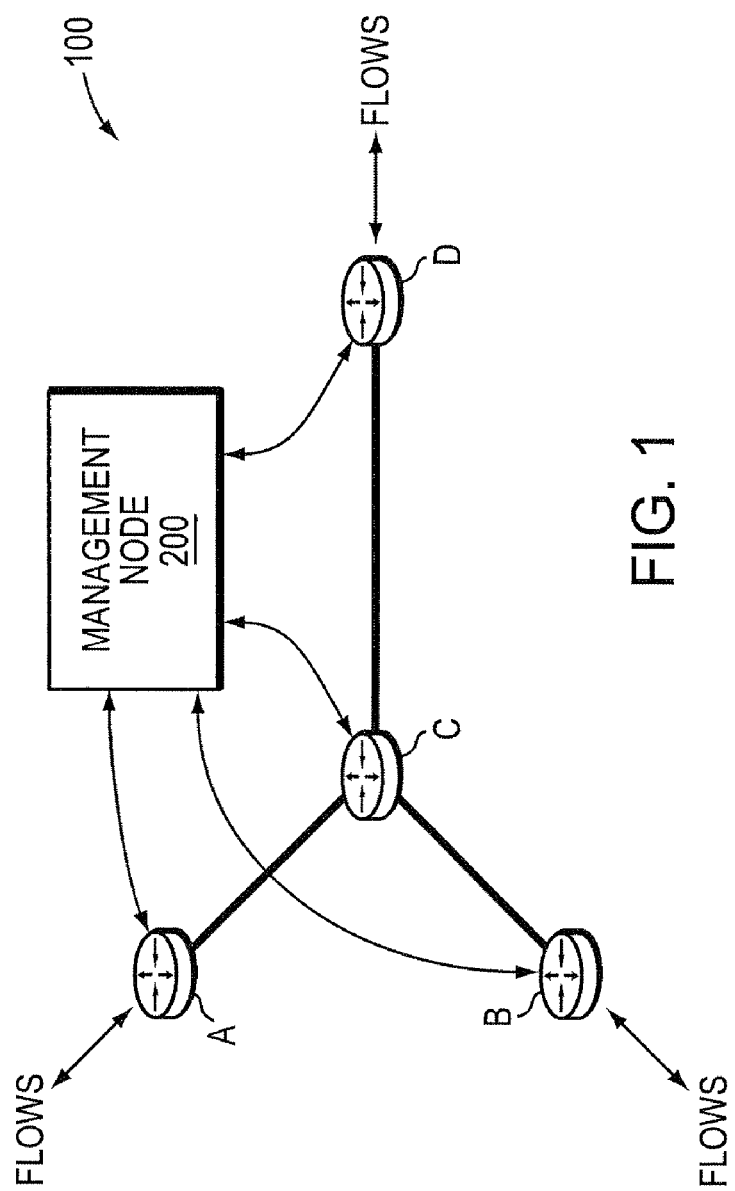
FIG. 1 illustrates an example computer network.

According to embodiments of the disclosure, one or more flows in a computer network may be monitored for a monitoring period, each flow being opened for a length of time until ending by one of either a distinct ending or by being silent longer than a configured aging timer, i.e., ending by aging, wherein a silent flow is a "zombie flow". In response to each first flow ending, a total flow time value may be increased by the length of time that first flow was open, and in response to each second flow ending by aging, a zombie flow time value may be increased by the aging timer (i.e., the length of time the flow was a zombie flow before ending). After the monitoring period has expired, a ratio of zombie flows at a particular time in the computer network that will be ended by aging may be estimated as the zombie flow time value divided by the total flow time value. Also, according to embodiments of the disclosure, a capacity improvement, performance hit, and accuracy hit may be predicted based on a tuned aging timer to a new aging timer value.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains.

FIG. 1 is a schematic block diagram of an example computer network 100 illustratively comprising nodes/devices, such as one or more routers A-D interconnected by links as shown. Illustratively, a management node 200 may be located within the network 100 and may communicate with one or more of the routers/nodes of the network in accordance with one or more embodiments described herein. Those skilled in the art will understand that any number of nodes, devices, links, etc. may be used in the computer network, and that the view shown herein is for simplicity.

Figure 2:
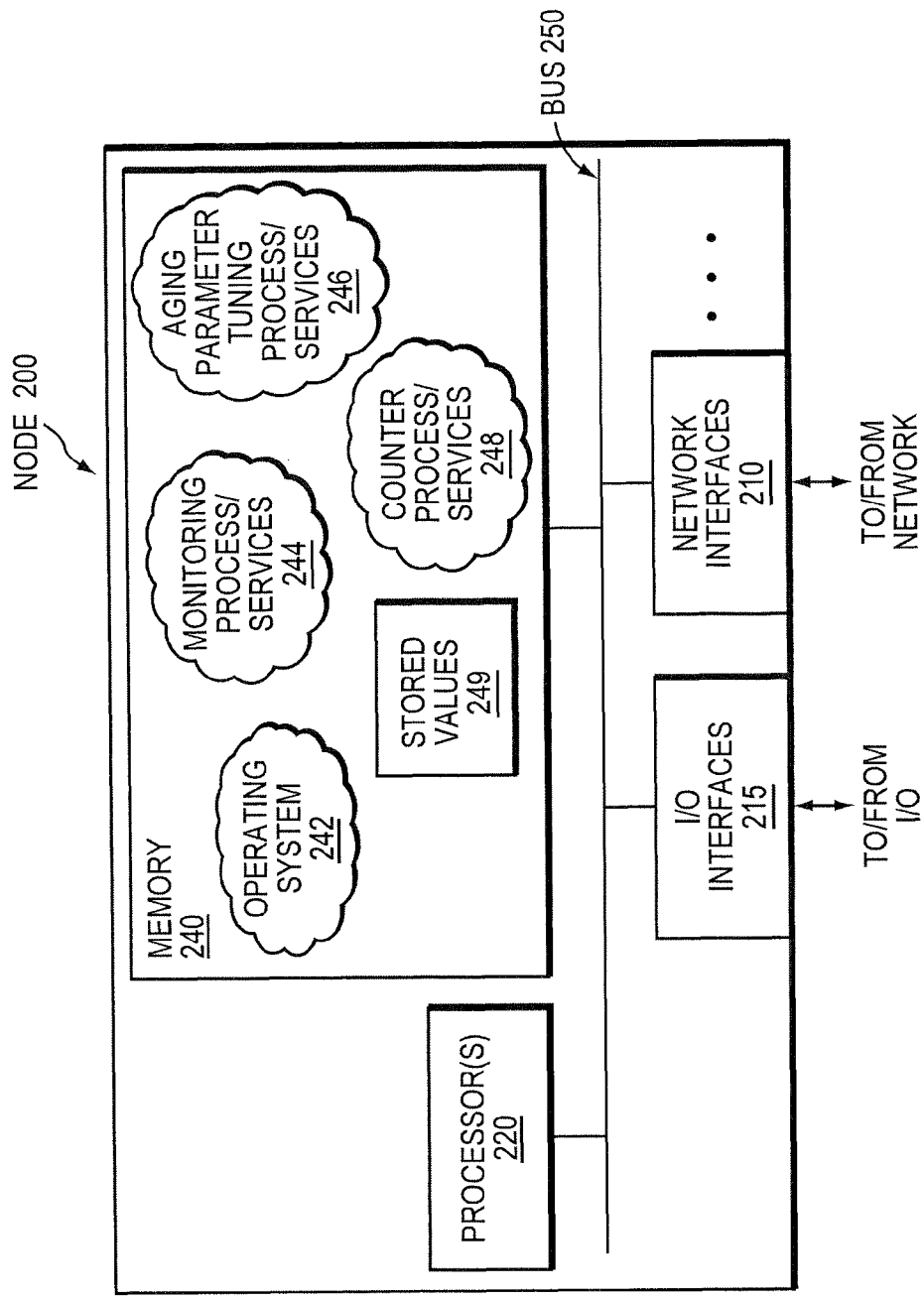
FIG. 2 illustrates an example network device/node.

FIG. 2 is a schematic block diagram of an example node/device 200 that may be advantageously used with one or more embodiments described herein, e.g., as a management node. The device comprises a plurality of network interfaces 210, one or more Input/Output (I/O) interfaces 215, one or more processors 220, and a memory 240 interconnected by a system bus 250. The I/O interfaces 215 contain the mechanical, electrical, and signaling circuitry for communicating with input and output devices, such as keyboards, mice, monitors, etc. The network interfaces 210 (which may be considered to be I/O interfaces) contain the mechanical, electrical, and signaling circuitry for communicating data over physical links coupled to the network 100. The network interfaces may be configured to transmit and/or receive data using a variety of different communication protocols, including, inter alia, the Transmission Control Protocol/Internet Protocol (TCP/IP), User Datagram Protocol (UDP), Asynchronous Transfer Mode (ATM) protocol, synchronous optical networks (SONET), wireless protocols, Frame Relay, Ethernet, Fiber Distributed Data Interface (FDDI), etc.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures, such as stored values 249 (described herein). An operating system 242, portions of which are typically resident in memory 240 and executed by the processor(s), functionally organizes the node by, inter alia, invoking network operations in support of software processes and/or services executing on the device. These software processes and/or services may comprise monitoring process/services 244, aging parameter tuning process/services 246, and one or more counter processes/services 248, each as described herein. It will be apparent to those skilled in the art that other processor and memory means, including various computer-readable media, may be used to store and execute program instructions pertaining to the inventive technique described herein.

Referring again to FIG. 1, data packets (e.g., traffic) may be exchanged among the nodes/devices of the computer network 100 using predefined network communication protocols such as TCP/IP, UDP, ATM, Frame Relay protocol, Internet Packet Exchange (IPX) protocol, etc. In particular, as will be understood by those skilled in the art, traffic may be categorized into particular "flows". A flow, generally, is an abstraction of a sequence of traffic defined by one or both endpoints, e.g., from a particular source (IP address and/or port) to a particular destination (e.g., IP address and/or port), and by a protocol type (e.g., TCP, UDP, etc.). Also, flows may be specific to a particular type of application. For example, traffic sent to a user downloading music from a centralized server may be classified as a flow, e.g., a stream of data from a source (server) to a destination (user), and may be a particular type of flow, e.g., peer-to-peer. Other types of flows will be readily apparent to those skilled in the art, and the definition and examples of flows used herein are merely illustrative.

Typically, various applications functioning on the nodes of the network (e.g., A-D) operate on a per-flow basis. For instance, illustrative applications may include, inter alia, traffic inspection systems, firewalls, flow-based forwarding, flow-based packet features (e.g., Network Address Translation or "NAT", Access Control Lists or "ACLs", Session Border Control or "S/BC", etc.), flow caches, preferential treatment of flows (Quality of Service or "QoS"), servers, other endpoints, etc. For example, a firewall may check a flow as it is initially opened to approve it (and all traffic associated therewith), but if the flow is closed/ended and reopened, the new (reopened) flow is re-checked. In addition to the illustrative applications that are per-flow-based, there are different types of flows, such as browsing sessions, peer-to-peer sessions, etc., as will be understood by those skilled in the art. In particular, there may be upwards of one hundred to two hundred different flow types traversing the links of network 100 at any given point in time.

Figure 3A:
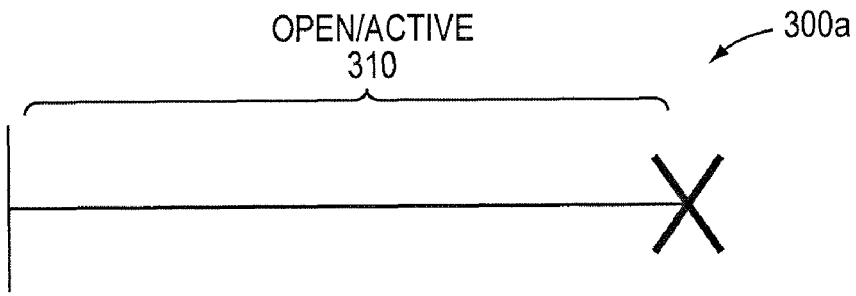
FIGS. 3A-C illustrate example flow representations.
Figure 3B:
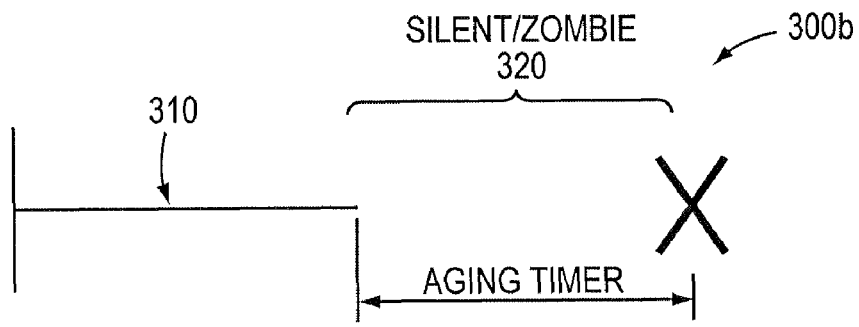
Figure 3C:
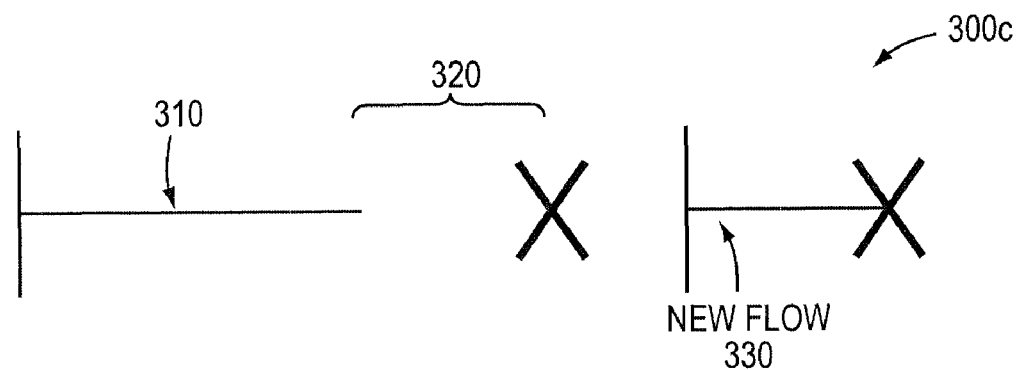

As noted, in systems that keep resources per flow, there is generally the issue of identifying when flows end and when their resources can be released. TCP flows, for example, may end cleanly with FIN messages. However, other flows, such as UDP or non-FIN TCP flows, generally end based on aging techniques, where silence (no traffic) for a length of time greater than an aging timer results in the flow being closed. For example, on a per-flow-type basis, browsing sessions may have aging timers of one minute (1:00), while peer-to-peer flows may have aging timers of twenty seconds (0:20). FIGS. 3A-C illustrate example representations 300 of flows (over time). For instance, in FIG. 3A, representation 300a shows a flow that is open and active (period 310) and ends cleanly at "X". FIG. 3B (300b) shows a flow that is open but ceases to receive traffic for a silent/zombie period 320 longer than the aging timer for that type of flow, and ends due to aging at "X". (Note that as used herein, a flow's opening or ending is determined according to the resources assigned to the flow in the network devices, that is, whether resources are allocated to the flow. Activity of the flow, on the other hand, is determined by the source device of flow traffic, that is, whether traffic is being sourced for the flow.) Also, FIG. 3C (300c) shows a flow that is open, then silent longer than the aging timer for that type of flow (period 320), and ends due to aging at "X". However, in FIG. 3C, the flow again transmits data after it has been ended, and thus forces the devices upon which it travels to open a new flow 330.

According to one or more embodiments described herein, a flow is declared a "zombie" if it is open in a device (i.e., resources are allocated for the flow), but the device will not see any more packets assigned to this flow (i.e., the flow will be closed by aging). The device finally closes the flow and releases the resources associated with this flow after the aging time has passed. For a given flow which will be closed in the device by aging, the following facts are relevant, as will be appreciated by those skilled in the art:

1. The flow will be a zombie flow for a time equal to the configured aging time of this flow type. Notably, long zombie flow times result in a capacity/resource utilization hit (waste/detriment); and
2. If the aging time is less than the maximum time of silence during the flow lifetime (i.e., FIG. 3C), the device will close the flow while the flow is still alive. When the next packet of the flow is received by the device, it will be considered a new flow. This will result in both performance degradation (i.e., a new classification will be needed, new action selections, etc.), and also in an accuracy hit (i.e., the rest of the flow will not be mapped correctly since it will be seen from the middle of the flow).

One particular target (goal) of designers/developers (or administrators) is to minimize the zombie time (to save resources/improve capacity), but not by so much that a performance and accuracy hit become too great. (Note that the opposite is also true, wherein the aging time can be enlarged to improve performance and accuracy as long as the capacity hit is acceptable.) Conventionally, however, tuning of aging parameters is achieved using trial and error methodology in an iterative manner; changing one aging time, and observing its result on resources/performance/accuracy by monitoring a live setup for a few hours (preferably at peak traffic hours), then changing another aging time and observing its result, and another, and again, and so on. Such conventional techniques are cumbersome and inefficient, and affect live traffic while modifications are performed, possibly causing undesirable network effects. In addition, in a typical network (IP), there may be over one hundred different aging times/parameters to tune based on the different protocols operating in that network. There remains a need, therefore, for a technique that provides a tool for use with tuning aging parameters of flows.

Tuning Aging Parameters

According to embodiments of the disclosure, one or more flows in a computer network may be monitored for a monitoring period. In response to each first flow ending, a total flow time value may be increased by a length of time that first flow was open, and in response to each second flow ending by aging, a zombie flow time value may be increased by the aging timer (i.e., the length of time the flow was a zombie flow before ending). After the monitoring period has expired, a ratio of zombie flows at a particular time in the computer network that will be ended by aging (i.e., without seeing any more packets) may be estimated as the zombie flow time value divided by the total flow time value. Also, according to embodiments of the disclosure, a capacity improvement, performance hit, and accuracy hit may be predicted based on a tuned aging timer to a new aging timer value.

In an illustrative embodiment, aging parameter tuning process 246 (in cooperation with monitoring process 244 and counter process 248) may contain computer executable instructions that when executed by each processor 220 may operate to perform functions relating to the novel techniques described herein. In particular, tuning process 246 may be used by a developer/administrator or by a device (management node, dynamically) to predict the effects of changing the aging time on capacity, performance, and accuracy. For instance, the techniques described herein may be used during initial network/node design, or when there is a shortage of network capacity/resources (e.g., CPU, memory, etc.) which may be recoverable. Notably, aging parameter tuning process 246, monitoring process 244, and counter process 248 may be portions of a management application on the management node, such as portions of, e.g., the Service Control Application for Broadband (SCA BB) of Cisco Systems, Inc.

Operationally, when enabled based on a manual or dynamic trigger, one or more flows in the computer network 100 may be monitored for a monitoring period (e.g., less than sixty seconds, illustratively only a few seconds). For instance, monitoring process 244 on a management node 200 having network interfaces 210 in communication with routers/devices A-D of the network may receive the monitored information accordingly. Notably, due to different traffic flow patterns during different times of day (e.g., morning versus night), better results may be obtained when the monitoring period corresponds to a particular time of day for which the aging parameters are in question. For instance, if the aging parameters dynamically adjust during different times of day, then those aging parameters should be tuned based on monitoring periods of the respective times of day. Conversely, it may be beneficial to have multiple monitoring periods (or longer monitoring periods) to capture monitored results that span/bridge the different times of day, e.g., for averaged information to provide an average estimation, as described herein.

During the monitoring period, the management device 200 may use counter process 248 to have one global counter measuring total open flow time, and one global counter per aging time which measures total zombie flow time of each particular type of flow (e.g., stored as values 249). In other words, in response to each flow ending (any type of flow), a total flow time value may be increased by a length of time that the ended flow was open (e.g., 310). Also, in response to each flow ending by aging, a zombie flow time value may be increased by the aging timer (i.e., the length of time the flow was a zombie flow before ending, e.g., 320). Illustratively, the zombie flow time value corresponds to a particular type of flow, which value is maintained for each particular type of flow. For example, if a browsing zombie flow ends, then a browsing zombie flow time value is increased, while if a peer-to-peer zombie flow ends, then a peer-to-peer zombie flow time value is increased. However, the total flow time value corresponds to any type of flow, and may be increased for both the browsing flow and peer-to-peer flow.

After the monitoring period (e.g., a few seconds), the device 200 can determine an estimate of the open zombie flows as a ratio (percent) of all open flows. In particular, the ratio of zombie flows of all types at a particular time in the computer network that will be ended by aging may be estimated as the sum of zombie flow time values for all types of flow divided by the total flow time value. In addition, for more granular results, a ratio of zombie flows of a particular type may be estimated as the zombie flow time value for that particular type of flow divided by the total flow time value.

Figure 4:
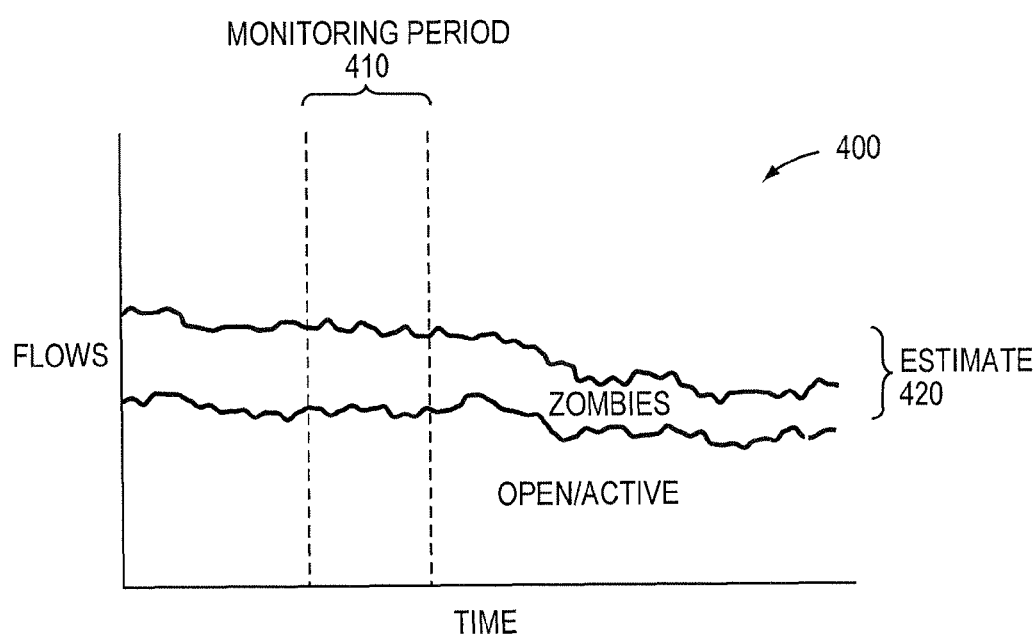
FIG. 4 illustrates an example graph of flows over time

For example, FIG. 4 illustrates an example graph 400 showing flows over time. Specifically, graph 400 illustrates an example representation of total flows, and a breakdown of an amount of flows that is zombie flows as compared to open/active flows. In particular, the graph 400 shows a comparison between the amount of time that flows are open and active/alive, versus the amount of time flows are silent/zombies (note that while the total amount of open flows may be monitored, the zombied flows themselves generally may not be specifically monitored, and the graph 400 is merely an example illustration for ease of discussion). During a particular monitoring period (e.g., 410), the device 200 may measure the approximate comparison, and the estimated ratio of zombie flows 420 may be the resultant gap as shown. Note that the estimation techniques herein assume that the estimate 420 remains relatively representative for any given period of time (that is, for any particular monitoring period), with the noted exception above for differences between time of day and other reasons.

Assume, for instance, that during the monitoring period, one hundred (100) flows end, either cleanly or by aging. Of those one hundred (100) flows, assume that each flow lasted for two minutes (2:00), also that twenty (20) flows ended by aging, and that the aging timer in all cases was thirty seconds (0:30). (Those skilled in the art will appreciate that this example is simplified, and that other possibilities exist. These values are merely used as an example.) Accordingly, using the technique described above, the total flow time value is two hundred minutes (3:20:00) or (100×2), and the total zombie time value ten minutes (20×0.5). The estimated ratio of zombie flows, then, is 10 divided by 200, or 5%. Note that in this example, twenty flows (aged) out of one hundred (total) is 20% of the flows. However, the estimate of zombie flows (resources lost) is related to the amount of time those resources are wasted based on the total time that all ended flows were active (e.g., 5% of the time).

In this manner, there is no need for actual tracking of which current open flows will be ended by aging. In particular, the technique is simple to implement in either software or hardware, and its results are obtained in a relatively short time (e.g., almost immediately). These estimations provide an aging status of flows in the network 100, that is, the potential for resources to be saved by aging tuning, as well as specific aging times that should be more specifically examined. For instance, these estimations may be used to determine an order of types of zombie flows, such as an ordered list of flow types from the highest amount of zombie flows (flow time) to the lowest amount. Accordingly, a configured number of types of zombie flows having a highest ratio of zombie flows may be determined, e.g., locating the top five zombie flow types (consuming the most resources). Conversely, a set of types of zombie flows having a highest ratio of zombie flows to a configured total ratio may be determined, e.g., locating the highest consuming zombie flow types that consume the top 10% of resources (e.g., nine zombie flow types). These ordered types of zombie flows, particularly the short returned lists (e.g., top 5 or 10%), may be used to narrow the focus of aging parameter tuning to those flows which may provide the greatest impact on network resource consumption/capacity.

Also, in addition to estimating the amount of zombie flows (for the particular types of flows), one or more embodiments described herein may predict a capacity improvement, performance hit, and accuracy hit based on tuning the aging parameters (e.g., the aging timer). For instance, an aging reduction factor may be selected (e.g., and/or received at the device 200) using various means. For example, a designer/administrator may arbitrarily decide on a reduction factor (e.g., ½), or a set of rules may be defined to select a reduction factor (e.g., 1%, then 2%, then 3%, etc., until a set of circumstances is satisfied). Based on the aging reduction factor, a capacity improvement in the computer network may be predicted as the ratio of zombie flows that will be ended by aging multiplied by the aging reduction factor. (Said differently, the techniques described herein may predict the capacity improvement gained by the aging reduction by multiplying the percent of zombie flows by the percent of aging reduction.) For example, if 10% of the flows are zombies, and the reduction factor is ½ (½ the current aging time), then the capacity improvement is predicted to be 5% (10% times ½). (Alternatively, 10% times 50% equals 5%).

Figure 5A:
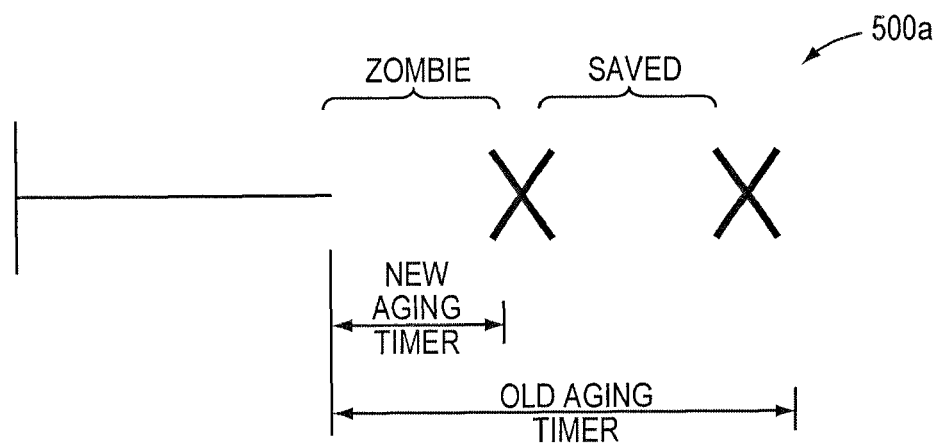
FIGS. 5A-B illustrate example flow representations.

FIG. 5A illustrates an example representation 500a of a zombie flow that would have saved resources (capacity improvement) based on a new aging timer (due to the aging reduction), accordingly. Assume, for instance, that there are one hundred (100) flows in the network 100, and twenty (20) of which are estimated to be zombies (20% of the flows, e.g., 20% of network resources/capacity). If the aging time (e.g., 0:30) is reduced by ½ (e.g., to 0:15), then ten (10) zombie flows (10% of the currently open flows) are predicted to be saved (a 10% capacity improvement) at a particular time, leaving only the remaining ten (10) zombies.

To predict a performance hit and accuracy hit based on tuning the aging parameters, the aging reduction factor may first be applied to the current aging timer to obtain a new aging timer (note that if a new aging timer is first selected, the aging reduction factor may have been computed in reverse, and this step need not reoccur). Once the new aging timer is set, the management device may monitor the flows of the network 100 for a second monitoring period (e.g., twice the current aging time). During the second monitoring period, the initial aging timer is still used for flows, but the new aging timer is used for calculations. In particular, the flow volume of the flows may be measured during the second monitoring period, and any flows that remain silent past the new aging timer, but not past the current aging timer, may be marked (e.g., as a misclassified event). (In other words, after this point the flow will reopen, and therefore cause a performance hit and the rest of the flow volume will be considered as misclassified since it will be mapped, as may be appreciated by those skilled in the art.) These marked flows may have their flow volumes additionally measured past the new aging timer, e.g., until the flows end or until the end of the second monitoring period. In response to each marked flow ending, a hit counter may be incremented (by 1), and a hit flow volume may be increased by the measured volume past (exceeding) the new aging timer of the ended marked flow. Also, in response to each (any) flow ending, a total flow counter may be incremented (by 1), and a total flow volume may be increased by the measured volume of the ended flow. (Notably, in a similar manner as mentioned above, the flows may correspond to particular types of flows with separate counters/values, accordingly.)

Figure 5B:
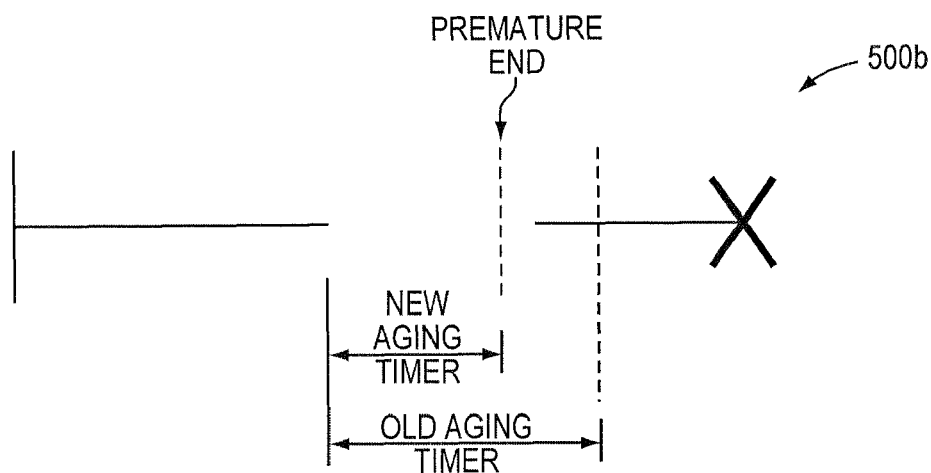

For example, assume that a new aging timer value of fifteen seconds (0:15) is selected, and the original timer is thirty seconds (0:30). As mentioned above, it was predicted that ten (10) original zombie flows would be saved, corresponding to a 2.5% increase in capacity. During the second monitoring period (e.g., two minutes, 2:00), however, it may be determined that five (5) of those zombie flows will be prematurely ended due to the new aging timer; i.e., those five flows were silent for more than fifteen seconds, but less than thirty (0:15<silence<0:30). As such, those five flows would be reopened (a reopen event), resulting in a performance and accuracy hit. (FIG. 5B illustrates an example representation 500b of a flow that would be incorrectly/prematurely ended by the new aging timer, accordingly.)

Further to this example, assume that one hundred (100) flows again end during the second monitoring period, and that those five misclassified zombie flows also end (after the new aging timer, that is). Also, assume that each of the one hundred (100) flows carried a volume of 100 megabits (Mb), and that the five misclassified zombie flows continued to carry a volume past the new aging timer of 10 Mb (e.g., and 90 Mb before, to total the 100 Mb). Accordingly, at the completion of the second monitoring period, the total flow volume of all the ended flows may be measured as 10,000 Mb (100×100), and the total flow counter is one hundred (100). Also, the hit flow volume may be measured as 50 Mb (10×5), and the hit counter is five (5).

To estimate a performance hit prediction caused by the new aging timer, the management node 200 (aging parameter tuning process 246) may divide the hit counter by the total flow counter, e.g., 5/100, or a 5% performance hit. In other words, five times out of a hundred, the new aging timer will have incorrectly/prematurely ended a flow (more so, that is, than the original aging timer); that is, the system may re-open those 5% of flows, e.g., opening flows one hundred five (105) times (100+5) instead of one hundred (100). Also, to estimate an accuracy hit prediction, the hit flow volume may be divided by the total flow volume, e.g., 50/10,000, or a 0.5% accuracy hit. In other words, 0.5% of the total volume of the flows will need to be reinstated as new flows to complete the incorrectly/prematurely ended flows. (Notably, volume may be used to determine accuracy as described herein, however other methods/measurements may be used in accordance with the techniques described herein.)

Once the estimations and predictions have been made, the aging timers may be adjusted for each type of flow, e.g., manually by a designer/administrator or dynamically by tuning process 246. For instance, if the estimations and predictions (e.g., the capacity improvement and/or performance/accuracy hits) are acceptably within certain desirable (configurable) thresholds, the aging timers (for each type of flow) may be adjusted as necessary. Illustratively, by tuning the aging timers for each flow type (e.g., particularly those of interest), a developer/administrator (or dynamic process) may determine with a degree of confidence that the new aging timer will be beneficial to a particular flow type, and to all the flows in general, for instance, improving capacity of network resources by a predicted amount.

For a new example, assume that an initial (current) aging timer is set for a particular flow as one minute (1:00), and that an estimate of 20% of the resources are consumed by zombie flows. By selecting a new aging timer of ten seconds (0:10), it may be predicted that 90% of the consumed resources may be saved (that is, 18% of the total resources). However, assume further that the estimated performance and/or accuracy hit produced by this new aging timer is greater than 5%. If this value is higher than desired (e.g., administrative decision or configured threshold), then a second new aging timer may be selected that is between the initial timer and the previous new timer (e.g., thirty seconds, 0:30). Accordingly, it may be predicted that 50% of the consumed resources may be saved (that is, 10% of the total resources), and now the estimated performance and/or accuracy hit produced by this new aging timer may be less than 5%, e.g., 1%. This manner of tuning the aging parameters may continue until all factors are satisfactory to the tuner, at which time the aging timers may be adjusted accordingly.

In addition, the flows may be monitored (e.g., by process 244) for a "post-monitoring period" (i.e., post adjustment of the aging timers) for validation of the ratio of zombie flows, namely, to determine whether the new estimation of zombie flows closely conforms to the expected capacity improvement. If not, it may be determined that the estimations were too simplified (e.g., that the monitoring period was too short), or that other factors may be contributing to the non-validated ratios (e.g., monitoring at different times of day), etc. Accordingly, in response to a non-validated ratio, that is, a ratio below the expected ratio (expected capacity improvement) by a configured amount, the aging timer may be re-tuned after another set of estimations/predictions, or the previous aging timers may be reinstated for further testing to ensure that the performance and accuracy hits were also predicted properly.

Figure 6:
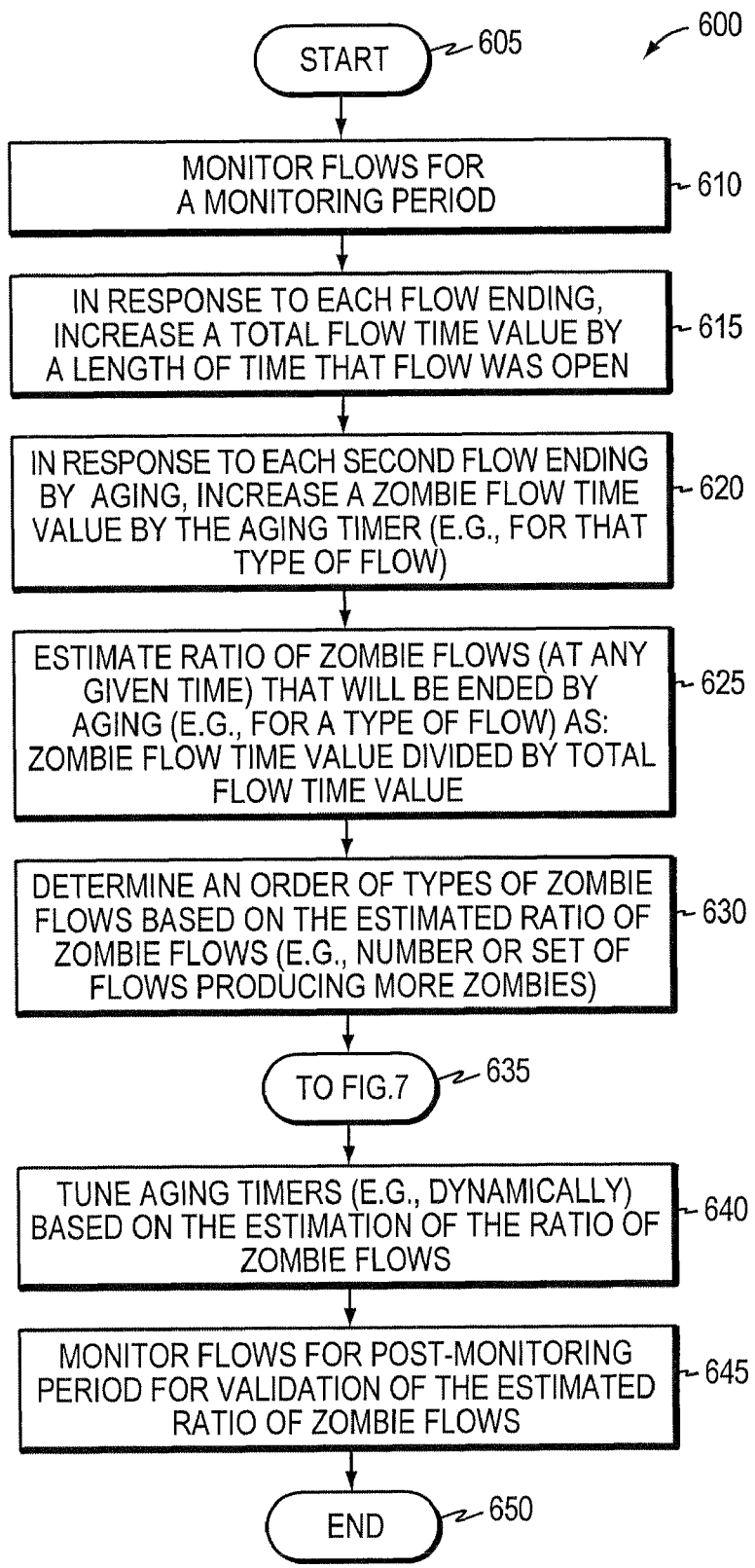
FIG. 6 illustrates an example procedure for estimating zombie flows for use with tuning aging parameters.

FIG. 6 illustrates an example procedure for estimating zombie flows in accordance with one or more embodiments described herein. The procedure 600 starts at step 605, and continues to step 610, where flows may be monitored for a monitoring period, e.g., as described above. In particular, during the monitoring period in step 615, in response to each flow ending, a total flow time value may be increased by a length of time that flow was open (e.g., after flow 1 ends after 1 minute, and flow 2 ends after 1.5 minutes, the total flow time is 2.5 minutes). Also, in step 620, in response to each flow ending by aging (i.e., each zombie flow), a zombie flow time value may be increased by the aging timer (that is, for the length of time the flow was a zombie flow before ending). Notably, as mentioned above, each type of flow may have a separate zombie flow time value, and such respective separate values may be updated according to the type of zombie flow that has ended. In step 625, the ratio of zombie flows (at a particular time) that will be ended by aging (e.g., for a particular type of flow) may be estimated as the zombie flow time value (e.g., all or a particular type) divided by total flow time value, as described above (e.g., 10%). Also, as mentioned above, in step 630, an order of types of zombie flows may be determined based on the estimated ratio of zombie flows, such as a number or set of flows producing more zombie flows (e.g., top 5 zombie flow types, or flow types corresponding to top 10% of zombie flows, etc.).

Figure 7:
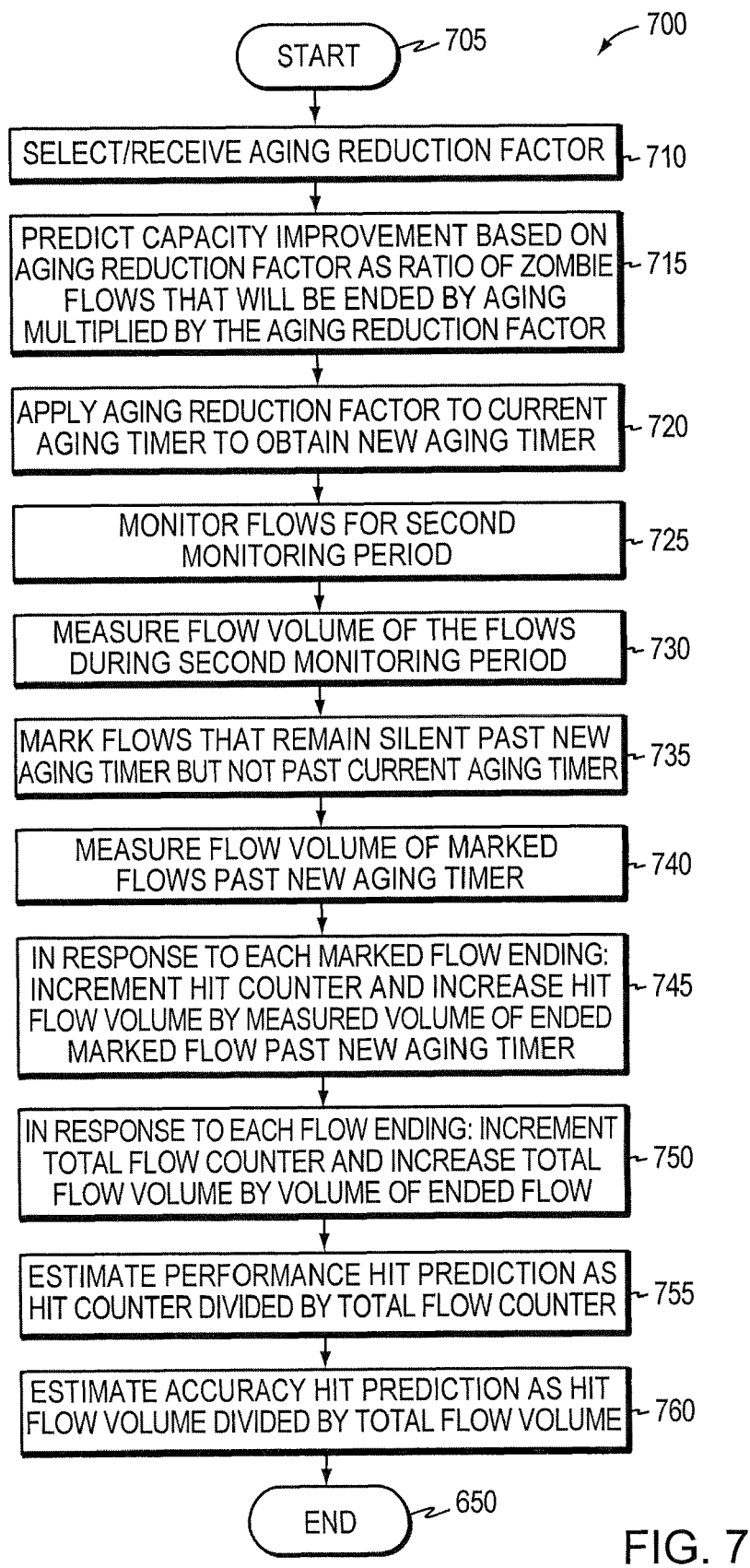
FIG. 7 illustrates an example procedure for predicting capacity improvements, performance hits, and accuracy hits for use with tuning aging parameters.

In step 635, procedure 600 may move to FIG. 7 for further predictive estimations. In particular, FIG. 7 illustrates an example procedure for predicting capacity improvements, performance hits, and accuracy hits in accordance with one or more embodiments described herein. The procedure 700 starts at step 705, and continues to step 710, where a proposed aging reduction factor is received/selected (e.g., ½). In step 715, the capacity improvement may be predicted based on the aging reduction factor as a ratio of the zombie flows that will be ended by aging multiplied by the aging reduction factor (e.g., 10% times ½, or 5% improvement). In addition, to estimate performance and accuracy hits, in step 720 the aging reduction factor may be applied to the current aging timer to obtain a new aging timer (e.g., ½ of 60 seconds=30 seconds), and the flows may be monitored in step 725 for a second monitoring period.

During the second monitoring period, the flow volumes of the flows may be measured in step 730, and any flows that remain silent past the new aging timer, but not past the current aging timer, are marked in step 735. Also, the flow volumes of those marked flows past the aging timer may be measured in step 740. In response to each marked flow ending, in step 745 a hit counter may be incremented (by 1) and a hit flow volume may be increased by the measured volume of the ended marked flow past the new aging timer. Further, in response to each flow ending (marked or non-marked), in step 750 a total flow counter may be incremented (by 1) and a total flow volume may be increased by the measured volume of the ended flow. A performance hit prediction may then be estimated for the new aging timer in step 755 as the hit counter divided by the total flow counter, while an accuracy hit prediction may be estimated in step 760 as the hit flow volume divided by the total flow volume. Procedure 700 may then end in step 765, notably returning to procedure 600.

Referring back to FIG. 6, procedure 600 may return from procedure 700 of FIG. 7 to step 640, where aging timers may be tuned (e.g., manually and/or dynamically) based on the estimation of the ratio of zombie flows (and based on the predictions/estimations of capacity, performance, and accuracy, accordingly) as described above. Also, in step 645, the flows may be monitored for a post-monitoring period for validation of the estimated ratio of zombie flows. The procedure 600 ends in step 650, with an estimation of the effects caused by a modified aging timer. Notably, while the procedures 600 and 700 are shown having steps in a particular order and with particular relationships, it is expressly contemplated that steps may be included, omitted, or moved from/within the procedures 600 and 700, and that the view shown herein is merely a representative example. For instance, the order of types of zombie flows need not be determined in step 630 prior to performing certain steps of procedure 700 (step 635).

Advantageously, the novel techniques described herein provide a powerful yet simple tool for use with tuning aging parameters of flows in a computer network. By estimating the effect of changing aging times of flows, the novel techniques allow for the analysis of system resources, performance, and accuracy. In particular, the techniques described above are based on prediction in live setups, and may be performed without significantly affecting a device's operation, and serves as a basis for automatic aging tuning by the device itself. That is, certain dynamic aspects of one or more embodiments described herein alleviate the need for cumbersome and inefficient manual configuration. Also, because the aging times need not be tuned prior to the analysis, the prediction-based techniques need not cause any interruption to the current operation of the network.

While there have been shown and described illustrative embodiments that provide a powerful yet simple tool for use with tuning aging parameters of flows in a computer network, it is to be understood that various other adaptations and modifications may be made within the spirit and scope of the present invention. For instance, the embodiments have been shown and described herein with certain example flows, times, and other values. However, the embodiments of the invention in their broader sense are not so limited. For example, the techniques described above may also be relevant for estimating effects on subscriber-related resources as well, as may be appreciated by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   monitoring, by a network node, a plurality of flows in a computer network for a monitoring period, each flow of the plurality flows being open for a length of time until ending by one of either a distinct ending or by being silent longer than a configured aging timer thereby ending by aging, wherein a flow is considered a zombie flow if the flow is open but will not receive any more packets and will eventually be silent longer than the configured aging timer and thereby end by aging;
   in response to each flow, of the plurality of flows, that is ending, increasing a total flow time value by a length of time that the flow was open;
   in response to each flow, of the plurality of flows, that is ending by aging, increasing a zombie flow time value by the aging timer; and
   estimating, after the monitoring period, a ratio of zombie flows to the plurality of flows at a time in the computer network as the zombie flow time value divided by the total flow time value.

2. The method as in claim 1, wherein the zombie flow time value corresponds to a type of flow, the method further comprising:
   increasing a zombie flow time value for the type of flow based on a type of the flow that is ending by aging.

3. The method as in claim 2, further comprising:
   estimating a ratio of zombie flows of a type to flows of the type at a time in the computer network as the zombie flow time value for that type of flow divided by the total flow time value.

4. The method as in claim 3, further comprising:
   determining an order of types of zombie flows based on the estimated ratio of zombie flows.

5. The method as in claim 4, further comprising:
   determining one of either a configured number of types of zombie flows having a highest ratio of zombie flows or a set of types of zombie flows having a highest ratio of zombie flows to a configured total ratio.

6. The method as in claim 2, further comprising:
   estimating a ratio of zombie flows of all types to flows of all types at a time in the computer network as the sum of zombie flow time values for all types of flow divided by the total flow time value.

7. The method as in claim 1, further comprising:
   selecting an aging reduction factor; and
   predicting a capacity improvement in the computer network based on the aging reduction factor as the ratio of zombie flows that is ended by aging multiplied by the aging reduction factor.

8. The method as in claim 1, further comprising:
   selecting an aging reduction factor;
   applying the aging reduction factor to a current aging timer to obtain a new aging timer;
   monitoring the plurality of flows for a second monitoring period;
   marking flows that remain silent past the new aging timer but not past the current aging timer;
   in response to each marked flow ending, incrementing a hit counter;
   in response to each flow, of the plurality of flows, ending, incrementing a total flow counter; and
   estimating, after the second monitoring period, a performance hit prediction as the hit counter divided by the total flow counter.

9. The method as in claim 1, further comprising:
   selecting an aging reduction factor;
   applying the aging reduction factor to a current aging timer to obtain a new aging timer;
   monitoring the plurality of flows for a second monitoring period;
   measuring flow volume of the plurality of flows during the second monitoring period;
   marking flows that remain silent past the new aging timer but not past the current aging timer;
   measuring flow volume of marked flows past the new aging timer;
   in response to each marked flow ending, increasing a hit flow volume by the measured volume of the ended marked flow past the new aging timer;
   in response to each flow, of the plurality of flows, ending, increasing a total flow volume by the volume of the ended flow; and
   estimating, after the second monitoring period, an accuracy hit prediction as the hit flow volume divided by the total flow volume.

10. The method as in claim 1, further comprising:
    tuning aging timers of one or more types of flows based on the estimation of the ratio of zombie flows.

11. The method as in claim 10, further comprising:
    determining whether adjusting the aging timer results in capacity improvement and performance and accuracy hits that are acceptable; and if so,
    adjusting the aging timer.

12. The method as in claim 11, further comprising:
    dynamically adjusting the aging timer.

13. The method as in claim 1, wherein the monitoring period corresponds to a time of day.

14. The method as in claim 1, further comprising:
    monitoring the flows for a post-monitoring period for validation of the estimated ratio of zombie flows.

15. The method as in claim 1, wherein the monitoring period is less than sixty seconds.

16. An apparatus, comprising:
    one or more network interfaces adapted to monitor a plurality of flows in a computer network for a monitoring period, each flow being open for a length of time until ending by one of either a distinct ending or by being silent longer than a configured aging timer thereby ending by aging, wherein a flow is considered a zombie flow if the flow is open but will not receive any more packets and will eventually be silent longer than the configured aging timer and thereby end by aging;

one or more processors coupled to the network interfaces and adapted to execute one or more processes; and a memory adapted to store an aging parameter tuning process executable by each processor, the tuning process when executed operable to: i) increase, in response to each flow, of the plurality of flows, that is ending, a total flow time value by a length of time that the flow was open; ii) increase, in response to each flow, of the plurality of flows, that is ending by aging, a zombie flow time value by the aging timer; and iii) estimate, is after the monitoring period, a ratio of zombie flows to the plurality of flows at a time in the computer network as the zombie flow time value divided by the total flow time value.

17. The apparatus as in claim 16, wherein the zombie flow time value corresponds to a type of flow, the tuning process when executed further operable to:

increase a zombie flow time value for the type of flow based on a type of the flow that is ending by aging; and estimate a ratio of zombie flows of a type to flows of the type at a time in the computer network as the zombie flow time value for that type of flow divided by the total flow time value.

18. The apparatus as in claim 16, wherein the tuning process when executed is further operable to:

receive an aging reduction factor;

apply the aging reduction factor to a current aging timer to obtain a new aging timer;

monitor the plurality of flows for a second monitoring period;

mark flows that remain silent past the new aging timer but not past the current aging timer;

increment a hit counter in response to each marked flow ending;

incrementing a total flow counter in response to each flow, of the plurality of flows, ending; and estimate, after the second monitoring period, a performance hit prediction as the hit counter divided by the total flow counter.

19. The apparatus as in claim 16, wherein the tuning process when executed is further operable to:

receive an aging reduction factor;

apply the aging reduction factor to a current aging timer to obtain a new aging timer;

monitor the plurality of flows for a second monitoring period;

measure flow volume of the flows during the second monitoring period;

mark flows that remain silent past the new aging timer but not past the current aging timer;

measure flow volume of marked flows past the new aging timer;

increase, in response to each marked flow ending, a hit flow volume by the measured volume of the ended marked flow past the new aging timer;

increase, in response to each flow, of the plurality of flows, ending, a total flow volume by the volume of the ended flow; and estimate, after the second monitoring period, an accuracy hit prediction as the hit flow volume divided by the total flow volume.

20. Software encoded in one or more non-transitory computer-readable media and when executed operable to:

monitor a plurality flows in a computer network for a monitoring period, each flow of the plurality of flows being open for a length of time until ending by one of either a distinct ending or by being silent longer than a configured aging timer thereby ending by aging, wherein a flow is considered a zombie flow if the flow is open but will not receive any more packets and will eventually be silent longer than the configured aging timer and thereby end by aging;

in response to each flow, of the plurality of flows, that ends, increase a total flow time value by a length of time that the flow was open;

in response to each flow, of the plurality of flows, that ends by aging, increase a zombie flow time value by the aging timer; and estimate, after the monitoring period, a ratio of zombie flows to the plurality of flows at a time in the computer network as the zombie flow time value divided by the total flow time value.

* * * * *